(12) United States Patent
Gesch et al.

(10) Patent No.: US 10,507,827 B2
(45) Date of Patent: Dec. 17, 2019

(54) VEHICLE BACKUP ASSISTANCE SYSTEM

(71) Applicants: DENSO International America, Inc., Southfield, MI (US); DENSO CORPORATION, Kariya-shi, Aichi-ken (JP)

(72) Inventors: Matthew Gesch, Livonia, MI (US); Jin Kurumisawa, Obu (JP); Takayuki Kimura, Kariya (JP); Miki Sato, Novi, MI (US); Katsuhiko Akamatsu, Kariya (JP)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 37 days.

(21) Appl. No.: 15/403,511

(22) Filed: Jan. 11, 2017

(65) Prior Publication Data

US 2018/0194346 A1   Jul. 12, 2018

(51) Int. Cl.
*B60W 30/09* (2012.01)
*B60W 10/18* (2012.01)
*B60W 50/14* (2012.01)

(52) U.S. Cl.
CPC ............ *B60W 30/09* (2013.01); *B60W 10/18* (2013.01); *B60W 50/14* (2013.01); *B60W 2050/143* (2013.01); *B60W 2050/146* (2013.01); *B60W 2420/42* (2013.01); *B60W 2420/52* (2013.01); *B60W 2420/54* (2013.01)

(58) Field of Classification Search
CPC .... B60R 1/00; B60R 2300/802; B60W 10/18; B60W 2050/143; B60W 2050/146; B60W 2420/42; B60W 2420/52; B60W 2420/54; B60W 30/09; B60W 50/14
See application file for complete search history.

(56) References Cited

U.S. PATENT DOCUMENTS

| | | | |
|---|---|---|---|
| 8,823,550 B2 | 9/2014 | Pampus et al. | |
| 8,972,142 B2 | 3/2015 | Takagi et al. | |
| 8,976,247 B1 | 3/2015 | Karner et al. | |
| 9,050,930 B2 | 6/2015 | Walsh et al. | |
| 2005/0131587 A1 | 6/2005 | Takamatsu | |
| 2013/0282252 A1* | 10/2013 | Takagi | B60T 7/22 701/70 |
| 2013/0297173 A1 | 11/2013 | Takagi et al. | |

FOREIGN PATENT DOCUMENTS

| | | |
|---|---|---|
| JP | 2005170295 A | 6/2005 |
| JP | 2012144162 A | 8/2012 |
| JP | 2013134591 A | 7/2013 |

* cited by examiner

*Primary Examiner* — Charles J Han

(74) *Attorney, Agent, or Firm* — Harness, Dickey & Pierce, P.L.C.

(57) ABSTRACT

A backup assistance system for a vehicle. The system includes a backup control module configured to restrict at least one of vehicle backup speed, acceleration, and jerk when a field of view of one or more backup sensors is restricted.

9 Claims, 3 Drawing Sheets

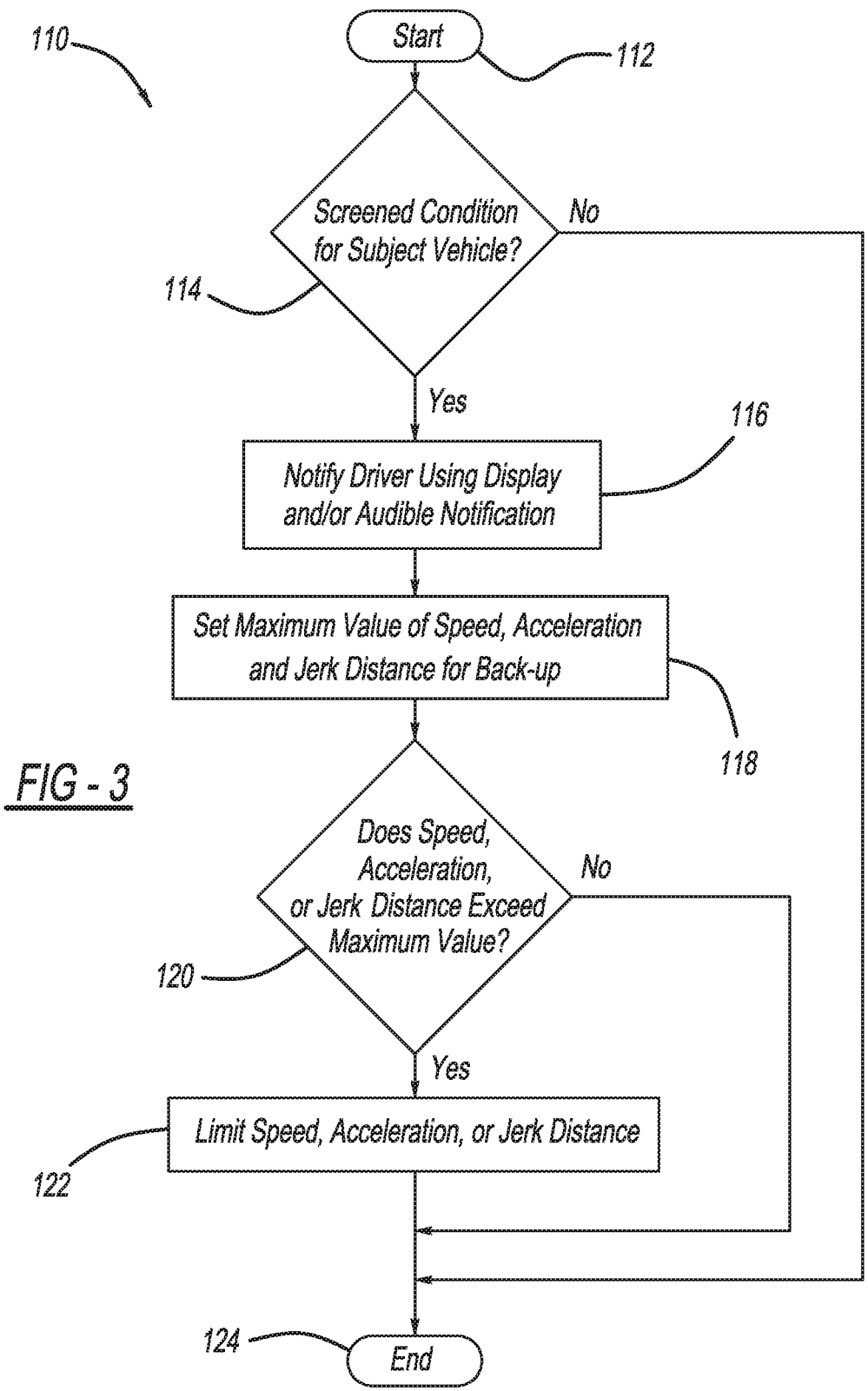

VEHICLE BACKUP ASSISTANCE SYSTEM

FIELD

The present disclosure relates to a vehicle backup assistance system.

BACKGROUND

This section provides background information related to the present disclosure, which is not necessarily prior art.

Vehicle backup assistance systems assist drivers with operating their vehicle in reverse, such as to avoid hitting obstacles or other objects. While current backup assistance systems are suitable for their intended use, they are subject to improvement. For example, in some cases, backup sensors may be blocked or "screened," such that the field of view of the backup sensors is reduced by objects on either side of the vehicle, such as parked vehicles, fences, or walls. When the backup sensors are "screened," they will typically have a reduced (e.g., more narrow) field of view, thereby making it more difficult for the sensors to detect nearby objects. In other words, due to the reduced field of view, the range of the backup sensors may be limited, and thus the driver may not be aware of objects until they are closer to the vehicle, which may make it more difficult to avoid the objects. The present teachings provide for a backup assistance system that addresses these needs in the art, as well as numerous others.

SUMMARY

This section provides a general summary of the disclosure, and is not a comprehensive disclosure of its full scope or all of its features.

The present teachings provide for a backup assistance system for a vehicle. The system includes a backup control module configured to restrict at least one of vehicle backup speed, acceleration, and jerk when a field of view of one or more backup sensors is restricted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 illustrates a method for assisting a driver with operating a vehicle in reverse according to the present teachings.

Corresponding reference numerals indicate corresponding parts throughout the several views of the drawings.

DETAILED DESCRIPTION

Example embodiments will now be described more fully with reference to the accompanying drawings.

Figure 1A:
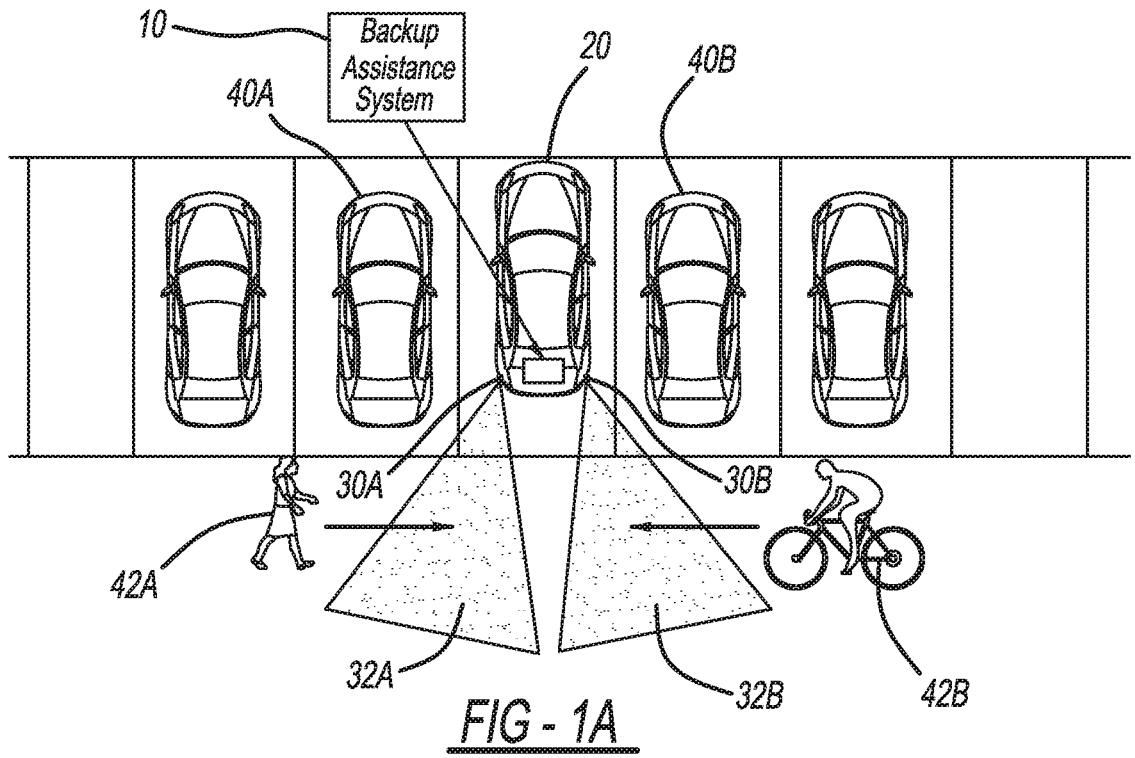
FIG. 1A illustrates a vehicle including a backup assistance system according to the present teachings with backup sensors thereof being screened by other parked vehicles.

With initial reference to FIG. 1A, a backup assistance system 10 according to the present teachings is included in an exemplary vehicle 20. The vehicle 20 is illustrated and described herein as a passenger vehicle. However, the backup assistance system 10 can be used with any suitable vehicle, such as any suitable recreational vehicle, mass transit vehicle, military vehicle, construction vehicle, watercraft, etc.

The backup assistance system 10 includes one or more backup sensors, such as backup sensor 30A and backup sensor 30B. The backup sensors 30A and 30B can be arranged at any suitable location about the vehicle 20, and any suitable number of backup sensors 30A/30B may be included. The backup sensors 30A and 30B can be any suitable sensors configured to detect objects that are proximate to, or within, a backup path of the vehicle 20. For example, the backup sensors 30A and 30B can be ultrasonic sonar sensors, LIDAR sensors, or radar sensors. The sensors 30A and 30B may also be, or the vehicle 20 can include, one or more rearview cameras. The rearview cameras are configured to capture images of the area about the backup path of the vehicle 20, and display one or more images of the area to the driver for reference by the driver when operating the vehicle 20 in reverse.

Figure 1B:
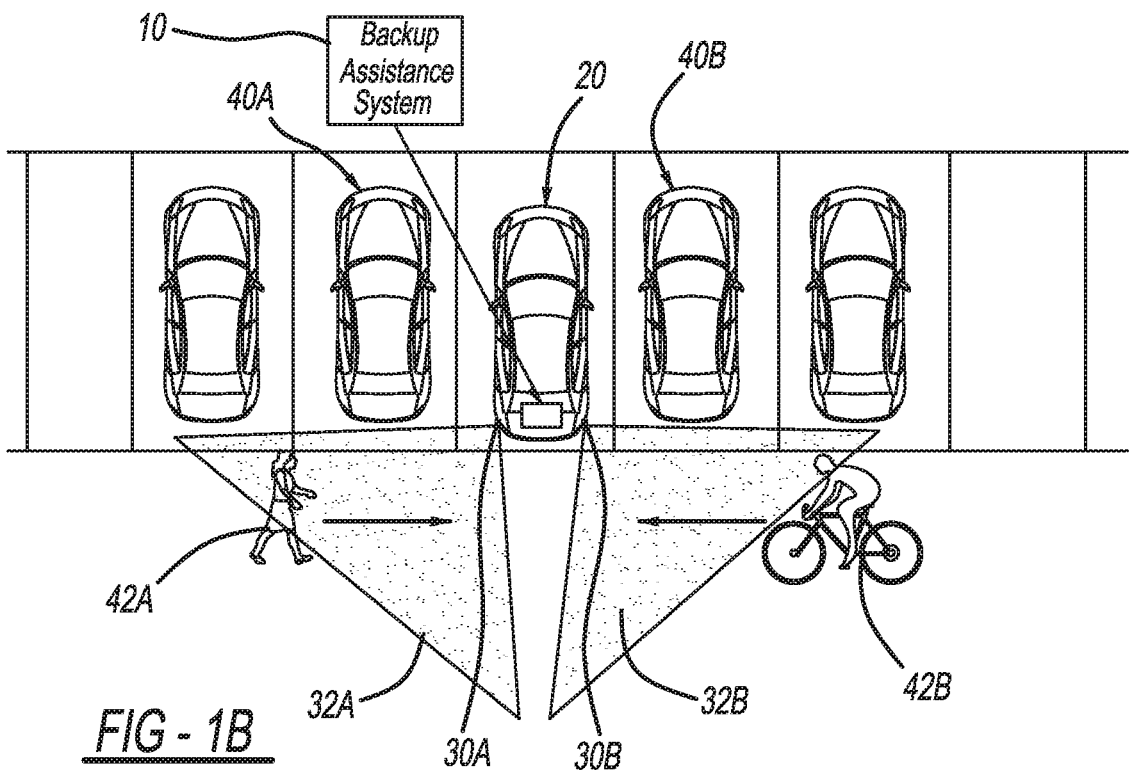
FIG. 1B illustrates the vehicle of FIG. 1A, which includes the backup assistance system according to the present teachings, moved to a position in which backup sensors thereof are no longer in a screened condition.

The backup sensors 30A and 30B have a field of vision 32A and 32B respectively. The field of vision 32A/32B is generally the area that the sensors are able to scan and sense objects within. The fields of vision 32A and 32B of each backup sensor 30A and 30B can be restricted or blocked by surrounding objects. For example and as illustrated in FIG. 1A, the field of vision 32A of the backup sensor 30A is blocked and restricted by vehicle 40A, which is parked to the left hand side of the vehicle 20. As a result, the backup sensor 30A is unable to detect the presence of pedestrian 42A. The field of vision 32B of the backup sensor 30B is blocked by parked vehicle 40B, and thus the backup sensor 30B is unable to detect the presence of the cyclist 42B. With reference to FIG. 1B, as the vehicle 20 backs out of its parking space, the fields of vision 32A and 32B of the backup sensors 30A and 30B is restored because the adjacent vehicles 40A and 40B no longer obstruct the backup sensors 30A and 30B. Thus in the unscreened condition illustrated in FIG. 1B, the backup sensor 30A is able to detect the presence of pedestrian 42A, and the backup sensor 30B is able to detect the presence of the cyclist 42B. Although the obstacles blocking the backup sensors 30A and 30B are illustrated as adjacent parked cars 40A and 40B, the sensors 30A and 30B are subject to being screened by any other object, such as fences or walls, which may be present in parking lots, for example.

Figure 2:
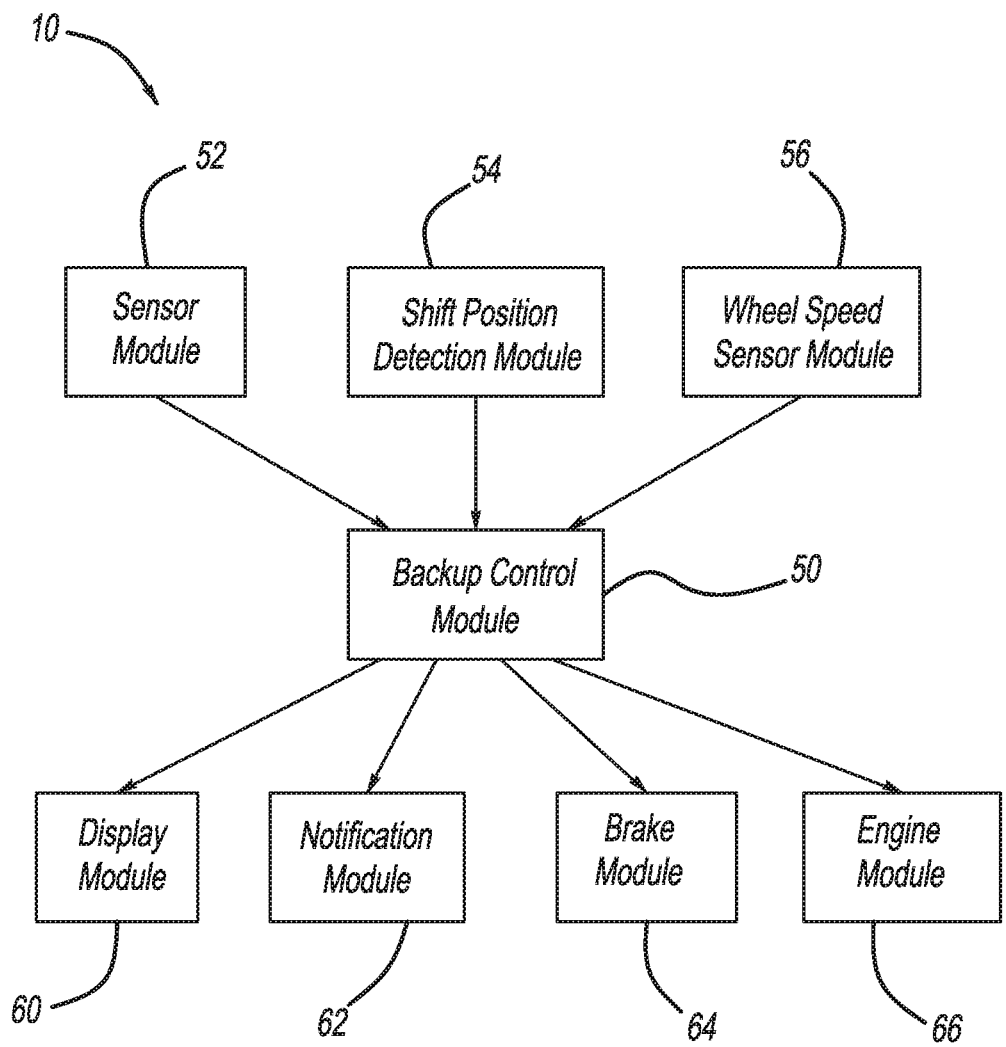
FIG. 2 illustrates components of the backup assistance system according to the present teachings.

With continued reference to FIGS. 1A and 1B, and additional reference to FIG. 2, the backup assistance system 10 according to the present teachings will now be described. The backup assistance system 10 includes a backup control module 50. The backup control module 50 receives inputs from a sensor module 52, a shift position detection module 54, and a wheel speed sensor module 56. The backup control module 50 generates outputs to a display module 60, a notification module 62, a brake module 64, and an engine module 66. Throughout this application the term "module" may be replaced with the term "circuit." The term module may refer to, be part of, or include processor hardware (shared, dedicated, or group), which executes code, and memory hardware (shared, dedicated, or group), which stores code executed by the processor hardware. The code is configured to provide the features of the modules described herein. With respect to the backup control module 50, it may include any suitable processor hardware, memory hardware, and code configured to provide the features of the backup control 50 described herein, as well as the features of the backup assistance system 10 generally.

The sensor module 52 includes any suitable backup sensor for the vehicle 20 configured to identify obstacles in or around a backup path of the vehicle 20. For example, the sensor module 52 can include the backup sensors 30A and 30B, as well as any other suitable backup sensor, such as any suitable ultrasonic sonar sensor, LIDAR sensor, radar sensor, and/or rearview camera. The sensor module 52 is further configured to determine when the field of vision (such as field of vision 32A and 32B) of the backup sensors (such as the sensors 30A and 30B) is restricted by nearby objects, such as the parked cars 40A and 40B on opposite sides of the vehicle 20, or any other vehicle, fence, wall, etc., particularly those that may be found in a parking lot. Thus the sensor module 52 is configured to determine when the fields of vision 32A and 32B, for example, are restricted as illustrated in FIG. 1A, and when the fields of vision 32A and 32B are generally unrestricted, such as illustrated in FIG. 1B. The sensor module 52 receives inputs from the backup sensors, such as sensors 30A and 30B, and is configured to process and analyze the inputs to determine whether the fields of vision 32A and 32B are restricted (i.e., screened) or unrestricted. The sensor module 52 is further configured to generate inputs to the backup control module 50 indicating whether or not one or more of the backup sensors 30A and 30B is screened, such that the field of vision 32A or 32B thereof is reduced.

The shift position detection module 54 is configured to identify the position of a gear shifter of the vehicle 20, and thus identify the gear that the vehicle 20 is in, such as when the vehicle 20 is in a reverse gear. The shift position detection module 54 is configured to generate an input to the backup control module 50 identifying the gear that the vehicle 20 is in.

The wheel speed sensor module 56 includes a sensor configured to determine the wheel speed of wheels of the vehicle 20. Any suitable wheel speed detection sensor can be used. The module 56 is configured to generate an input to the backup control module 50 identifying the wheel speed of the wheels of the vehicle 20.

The backup control module 50 is generally configured to restrict at least one of the vehicle backup speed, acceleration, and jerk when the field of view 32A/32B of one or more of the backup sensors 30A/30B is restricted, as is illustrated in FIG. 1A. Limiting the vehicle jerk refers to limiting the rate of change of acceleration of the vehicle 20. The backup control module 50 can be further configured to stop the vehicle 20 automatically when the sensors 30A/30B are no longer in the screened condition of FIG. 1A (and have thus moved to the unscreened condition of FIG. 1B) to give the driver the opportunity to check for obstacles. The backup control module 50 can set a distance that the vehicle 20 is permitted to travel in reverse before the brakes are automatically applied to stop the vehicle 20 so the area behind the vehicle 20 can be checked for obstacles as the vehicle 20 backs out of, for example, a parking space.

The backup control module 50 can be configured to set a maximum value (or predetermined limit) for the vehicle backup speed, acceleration, and/or jerk. The maximum value may be set by the manufacturer, or custom set by the driver. The backup control module 50 may be further configured to set the maximum value based on the degree to which the field of vision 32A/32B is screened or restricted. For example, if the field of vision 32A/32B is only slightly restricted, the backup control module 50 can be configured to set the maximum speed, acceleration, and jerk to be greater than when the field of vision 32A/32B is restricted or screened to a greater extent.

When the backup control module 50 determines that, based on inputs from the sensor module 52, the field of vision 32A/32B of one or more of the sensors 30A/30B has been restricted, the backup control module 50 sends an input to the display module 60 commanding the display module 60 to notify the driver of the vehicle 20 of the screened condition (i.e., that the field of vision 32A and/32B has been restricted). The display module 60 is configured to notify the driver of the screen condition in any suitable manner. For example, the display module 60 can display an alert to the driver. The backup control module 50 can also command notification module 62, which includes any suitable audio and/or visual alert, to notify the driver of the screen condition. For example, the notification module 62 can include an audible buzzer or chime, and/or an indicator light, notifying the driver of the screen condition of the sensors 30A and/or 30B.

When the backup control module 50 identifies a screened condition of the sensors 30A/30B and that the transmission of the vehicle 20 has been shifted into reverse based on an input from the shift position detection module 54, the backup control module 50 is configured to command the brake module 64 to limit the distance that the vehicle 20 can travel in reverse before being automatically stopped to allow the driver time to scan the area behind the vehicle 20 for obstacles. The backup control module 50 is also configured to transmit a command to the engine module 66 instructing the engine module 66 to limit the backup speed of the vehicle 20 and/or the reverse acceleration speed of the vehicle 20 such that the backup speed, acceleration, and/or jerk does not exceed the maximum values thereof stored at and/or set by the backup control module 50. The brake module 64 can be any suitable device configured to apply the brakes of the vehicle 20. The engine module 66 can be any suitable device, such as an engine control unit, configured to regulate engine speed and/or acceleration of the vehicle 20 when operated in reverse.

With continued reference to FIGS. 1A, 1B, and 2, and additional reference to FIG. 3, a method 110 for assisting a driver with operating the vehicle 20 in reverse will now be described. The method begins at block 112 when the backup control module 50 detects that the transmission of the vehicle 20 has been shifted to reverse, in response to an input received from the shift position detection module 54. At block 114, the sensor module 52 determines whether or not the backup sensors 30A and/or 30B are being operated in a screened condition. In other words, the sensor module 52 determines whether the field of vision 32A and/or 32B of the sensors 30A and/or 30B is restricted due to the presence of objects adjacent to the vehicle 20, such as the parked cars 40A and 40B, or any other object. The sensor module 52 informs the backup control module 50 whether a screened condition is present or not.

If the field of vision 32A and/or 32B is not restricted, the method 110 proceeds to end block 124 and the vehicle 20 is allowed to operate in reverse without any restrictions on the backup speed, acceleration, or jerk. If a screened condition is detected, the method 110 proceeds to block 116 where the backup control module 50 notifies the driver of the screened condition using one or both of the display module 60 and the notification module 62 to provide any suitable visual and/or audible alert.

From block 118 the method 110 proceeds to block 120, where the backup control module 50 determines whether or not the backup speed, acceleration, or jerk exceeds the maximum values thereof. If the maximum values have not been exceeded, the method 110 proceeds to block 124 and the vehicle 20 is allowed to operate in reverse without restrictions. If at block 120 the backup control module 50 determines that the backup speed, acceleration, or jerk exceeds the maximum values thereof, the backup control module 50 limits the backup speed, acceleration, and/or jerk at block 122 so that the maximum values thereof are not exceeded. The method 110 ends at block 124 when the vehicle 20 has safely completed its reverse operation (e.g., until the vehicle 20 has successfully backed out of its parking spot).

The present teachings thus advantageously provide for a backup assistance system 10 and a method 110 for assisting a driver with operating a vehicle in reverse when backup sensors, such as sensors 30A and/or 30B, have a field of vision 32A/32B restricted or screened by surrounding objects. When the field of vision 32A and/or 32B is restricted, the backup control module 50 limits the backup speed, acceleration, and/or jerk distance of the vehicle 20 when operated in reverse to minimize the possibility of contact between the vehicle 20 and obstacles outside the field of vision 32A/32B, such as the pedestrian 42A and the cyclist 42B illustrated in FIG. 1A. After the vehicle 20 has reversed far enough beyond the parked cars 40A/40B such that the field of vision 32A/32B has been restored, as illustrated in FIG. 1B, the backup control module 50 will no longer limit the backup speed, acceleration, or jerk because the backup sensors 30A and 30B should be operable to adequately notify the driver of the vehicle 20 of surrounding obstacles, such as the pedestrian 42A and the cyclist 42B illustrated in FIG. 1B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A backup assistance system for a vehicle, the system comprising:
   a sensor module including backup sensors that identify obstacles proximate to a backup path of the vehicle, the sensor module configured to determine when a field of view of the backup sensors is obstructed;
   a notification module configured to notify a driver of the vehicle that the field of view of the backup sensors is obstructed; and
   a backup control module configured to set a maximum value,
   wherein the maximum value is at least one of a maximum vehicle backup speed, a maximum vehicle acceleration, and a maximum vehicle jerk when the field of view of the backup sensors is obstructed, and wherein the maximum value is proportional to a degree that the field of view of the backup sensors is obstructed such that the maximum value is higher when the field of view is obstructed a first degree than when the field of view is obstructed a second degree, wherein the first degree is less than the second degree, and wherein the backup control module is further configured to restrict at least one of the backup speed, acceleration, and jerk of the vehicle to a predetermined limit.

2. The backup assistance system of claim 1, wherein the backup control module is configured to restrict the at least one of the backup speed, acceleration, and jerk of the vehicle until the field of view of the backup sensors is unobstructed.

3. The backup assistance system of claim 1, wherein the backup sensors include at least one of an ultrasonic sonar sensor, a LIDAR sensor, a radar sensor, and a rear view camera.

4. The backup assistance system of claim 1, wherein the notification module includes at least one of an audible alert and a visual alert.

5. The backup assistance system of claim 1, further comprising a shift position detection module configured to detect when a reverse gear of the vehicle has been engaged;

wherein the backup control module is activated when the shift position detection module is in the reverse gear.

6. The backup assistance system of claim 1, further comprising a wheel speed sensor module configured to measure wheel speed of wheels of the vehicle, the wheel speed sensor module is in cooperation with the backup control module to provide the wheel speed thereto.

7. The backup assistance system of claim 1, further comprising a display module configured to notify the driver of the vehicle that the field of view of the backup sensors is obstructed.

8. The backup assistance system of claim 1, further comprising a brake module configured to restrict the at least one of the backup speed, acceleration, and jerk of the vehicle;

wherein the brake module is controlled by the backup control module.

9. The backup assistance system of claim 1, further comprising an engine module configured to restrict at least one of the backup speed and acceleration of the vehicle:

wherein the engine module is controlled by the backup control module.

* * * * *

UNITED STATES PATENT AND TRADEMARK OFFICE
CERTIFICATE OF CORRECTION

PATENT NO. : 10,507,827 B2  
APPLICATION NO. : 15/403511  
DATED : December 17, 2019  
INVENTOR(S) : Matthew Gesch et al.

Page 1 of 1

It is certified that error appears in the above-identified patent and that said Letters Patent is hereby corrected as shown below:

In the Claims

Column 8, Line 22: In Claim 9, delete "vehicle:" and insert --vehicle;-- therefor Signed and Sealed this
Twenty-fifth Day of February, 2020

Andrei Iancu
*Director of the United States Patent and Trademark Office*